(12) United States Patent
Kask (10) Patent No.: US 8,705,834 B2
(45) Date of Patent: Apr. 22, 2014

(54) METHODS AND APPARATUS FOR IMAGE ANALYSIS USING THRESHOLD COMPACTNESS FEATURES

(75) Inventor: Peet Kask, Harju maakond (EE)

(73) Assignee: PerkinElmer Cellular Technologies Germany GmbH, Tallinn (EE)

( * ) Notice: Subject to any disclaimer, the term of this patent is extended or adjusted under 35 U.S.C. 154(b) by 117 days.

(21) Appl. No.: 13/291,433

(22) Filed: Nov. 8, 2011

(65) Prior Publication Data

US 2013/0114874 A1 May 9, 2013

(51) Int. Cl.
*G06K 9/00* (2006.01)

(52) U.S. Cl.
USPC .......................... 382/133; 382/173; 382/203

(58) Field of Classification Search
None
See application file for complete search history.

(56) References Cited

U.S. PATENT DOCUMENTS

| | | | |
|---|---|---|---|
| 4,097,845 A | 6/1978 | Bacus | |
| 4,183,013 A * | 1/1980 | Agrawala et al. | 382/173 |
| 5,933,519 A * | 8/1999 | Lee et al. | 382/133 |
| 2001/0041347 A1 | 11/2001 | Sammak et al. | |
| 2006/0110048 A1* | 5/2006 | Charlin et al. | 382/224 |
| 2006/0127881 A1* | 6/2006 | Wong et al. | 435/4 |
| 2007/0206864 A1* | 9/2007 | Charlin et al. | 382/224 |
| 2008/0166035 A1 | 7/2008 | Qian et al. | |
| 2008/0176276 A1 | 7/2008 | Arai | |
| 2010/0111397 A1* | 5/2010 | Garud et al. | 382/133 |
| 2010/0150423 A1 | 6/2010 | Hong et al. | |
| 2013/0064441 A1 | 3/2013 | Kask | |
| 2013/0064468 A1* | 3/2013 | Kask et al. | 382/257 |

FOREIGN PATENT DOCUMENTS

| | | |
|---|---|---|
| EP | 2012254 A1 | 1/2009 |
| WO | WO-2013/038224 A1 | 3/2013 |
| WO | WO-2013/038225 A1 | 3/2013 |
| WO | WO-2013/068780 A1 | 5/2013 |
| WO | WO-2013/068781 A1 | 5/2013 |

OTHER PUBLICATIONS

Al-Kofahi et al, Improved Automatic Detection and Segmentation of Cell Nuclei in Histopathology Images, IEEE Transactions on Biomedical Engineering, vol. 57, No. 4, Apr. 2010, pp. 841-852, (12 pages).
Beare, itkMorphologicaiSignedDistanceTransformImageFilter.h, 2008, The Insight Journal Jan.- Jun. 2008, p. 1-4, (7 pages).
Beare, itkParabolicErodeDilateImageFilter.h, 2008, The Insight Journal Jan.- Jun. 2008, p. 1-5, (8 pages).
Beare, itkParabolicErodeImageFilter.h, 2008, The Insight Journal Jan.- Jun. 2008, p. 1-2, (5 pages).
Beare, perfDT.cxx, 2008, The Insight Journal Jan.-Jun. 2008, p. 1-3, (6 pages).

(Continued)

*Primary Examiner* — Jon Chang
(74) *Attorney, Agent, or Firm* — Choate Hall & Stewart LLP (57) ABSTRACT

A new family of morphological features, referred to herein as threshold compactness features, is provided, useful for automated classification of objects, such as cells, in images. In one embodiment, one or more thresholds and/or binary masks are applied to an image, and one or more provisional objects within a cell in the image are automatically identified. The threshold compactness of the cell is computed as a function of area S of the one or more provisional objects and border length P of the one or more provisional objects. Computation of threshold compactness allows cells in an image to be distinguished and characterized. Compared to previous techniques, the methods and apparatus described herein are more robust and computationally efficient.

14 Claims, 9 Drawing Sheets

(56) References Cited

OTHER PUBLICATIONS

Beare, Richard, Morphology with Parabolic Structuring Elements, Dec. 16, 2008, 6 pages, Department of Medicine, Monash University, Melbourne Australia, URL:http://fweb.archive.orgjweb/20101007114622/http://www.insight-journal.orgjbrowse/publication/228.

Beare, Richard: itkParabolicUtils_h, Oct. 7, 2010, Department of Medicine, Monash University, Melbourne, Australia, 4 pages.

Chen, Xiang et al., Automated Interpretation of Subcellular Patterns in Fluorescence Microscope Images for Location Proteomics, International Society for Analytical Cytology, Cytometry Part A 69A: 631-640 (2006) 10 pages.

Cosio, F.A. et al., Automatic Analysis of Immunocytochemically Stained Tissue Samples, Medical and Biological Engineering and Computing, vol. 43, 2005, 6 pages.

Ersoy, Ilker et al., Multi-Feature Contour Evolution for Automatic Live Cell Segmentation in Time Lapse Imagery, 30th Annual International IEEE EMBS Conference, Aug. 20, 2008, 4 pages.

Ferreira, Tiago A. et al., The ImageJ User Guide—Version 1.43, hhttp://rsbweb.nih.gov/ij/docs/user-guide.pdf, Apr. 20, 2010, 189 pages.

Hamilton, Nicholas A. et al., Fast Automated Cell Phenotype Image Classification, BMC Bioinformatics, Mar. 30, 2007, 8 pages.

Held, Michael et al., CellCognition: Time-Resolved Phenotype Annotation in High-Throughput Live Cell Imaging, Nature Methods, vol. 7, No. 9, Sep. 2010, 10 pages.

Hiremath, P.S. et al., Automatic Classification of Bacterial Cells in Digital Microscopic Images, International Journal of Engineering and Technology, vol. 2, No. 4, Dec. 2009, 7 pages.

ImageJ's Subtract Background Code, Jan. 10, 2008, 89 pages, retrieved from internet: http://imageja.git.sourceforge.net/git/gitweb.cgi?p=imageja%2Fimageja;a=commitdiff_plain;h=73ae9a1fc4b1d09e4f0b60f5377ddc609aee7bff.

International Search Report for PCT/IB2011/002726, 3 pages (Jun. 5, 2012).

International Search Report for PCT/IB2011/002757, May 18, 2012, 4 pages.

International Search Report for PCT/IB2011/002969, mailed Mar. 16, 2012, 4 pages.

International Search Report for PCT/IB2011/002971, mailed May 5, 2012, 5 pages.

Jun et al., Cellimage Processing Based on Distance Transform and Regional Growth, Fifth International Conference on Internet Computing for Science and Engineering, Nov. 1, 2010, pp. 6-9, (5 pages).

Kittler, J., Feature Set Search Algorithms, NATO ASI Series: Series E, Applied Science, 41-60 (1978).

Knowles, D.W., Automated Local Bright Feature Image Analysis of Nuclear Protein Distribution Identifies Changes in Tissue Phenotype. Proceedings of the National Academy of Sciences, vol. 103, No. 12, Jan. 1, 2006, 6 pages.

Kojima S. et al., One-Dimensional Processing Architecture for Gray-Scale Morphology, Systems & Computer in Japan, vol. 27, No. 12, Nov. 15, 1996, 8 pages.

Lin et al., Automated 3-D Quantification of Brain Tissue at the Cellular Scale from Multi-Parameter Confocal Microscopy Images, IEEE, Apr. 1, 2007, 4 pages.

Lindblad, Joakim et al., Image Analysis for Automatic Segmentation of Cytoplasms and Classification of Rac1 Activation, Cytometry, vol. 57A, No. 1, Jan. 1, 2004, 12 pages.

Ljosa, Vebjorn, et al., Introduction to the Quantitative Analysis of Two-Dimensional Fluorescence Microscopy Images for Cell-Based Screening, PloS Computational Biology, vol. 5, Issue 12, Dec. 2009, 10 pages.

Loo, Lit-Hsin et al., Image-Based Multivariate Profiling of Drug Responses from Single Cells, Nature Methods, vol. 4, No. 5, May 2007, pp. 445-453, 9 pages.

Mircic, S. et al., Application of Neural Network for Automatic Classification of Leukocytes, Neural Network Applications in Electrical Engineering, IEEE, Sep. 1, 2006, 4 pages.

Nilufar S. et al., Automatic Blood Cell Classification based on Joint Histogram Based Feature and Bhattacharya Kernel, Signals, Systems and Computers, IEEE, Oct. 26, 2008, 4 pages.

Opening (morphology), Apr. 2, 2010, Wikipedia.org, p. 1-2, (2 pages).

Pekalska, E. et al., Pairwise Selection of Features and Prototypes, Advances in Soft Computing, 1-8 (2005).

Ramoser, H. et al., Leukocyte Segmentation and Classification in Blood-Smear Images, Proceedings of the 2005 IEEE Engineering in Medicine and Biology 27th Annual Conference, Sep. 1, 2005, 4 pages.

Serra, Jean, Image Analysis and Mathematical Morphology, Academical Press, 1984, 2 pages.

Sternberg, Stanley R., Biomedical Image Processing, Computer, IEEE Service Center, Los Alamitos, CA, US, vol. 16, No. 1, 1983, pp. 23-34.

Tscherepanow et al., Automatic Segmentation of Unstained Living Cells in Bright-Field Microscope Images, 2008, Advances in Mass Data Analysis of Images and Signals in Medicine, Biotechnology, Chemistry and Food Industry Lecture Notes in Computer Science, vol. 5108, p. 158-172.

Van Dem Boomgaard, R. et al., Quadratic Structuring Functions in Mathematical Morphology, Mathematical Morphology and Its Applications to Image and Signal Processing, Kluwer Academic Publishing, May 1, 1996, 8 pages.

Walker, R.F. et al., Classification of Cervical Cell Nuclei Using Morphological Segmentation and Textural Feature Extraction, IEEE, 297-301 (1994).

Waltz, Binary Dilation Using SKIPSM: Some Interesting Variations, Sep. 18, 1997, Proc. SPIE 3205, Machine Vision Applications, Architectures, and Systems Integration VI, p. 117-124.

Wang, Jun et al., Cellular Phenotype Recognition for High-Content RNA Interference Genome-Wide Screening, J. Biomol Screen 2008 13:29, 12 pages.

Wang, M., Feature Extraction, Selection and Classifier Design in Automated Time-Lapse Fluorescence Microscope Image Analysis, Microscopy: Science, Technology, Applications and Education, Jan. 1, 2010, 11 pages.

Webb, A.R., Feature Selection and Extraction, Statistical Pattern Recognition, 307-318 (2002).

Wilkinson, M.H.F. et al., Digital Image Analysis of Microbes, John Wiley and Sons, 1998, 1 page.

Witten Opinion for PCT/IB2011/002969, mailed Mar. 16, 2012, 10 pages.

Written Opinion for PCT/IB2011/002726, 8 pages (Jun. 5, 2012).

Written Opinion for PCT/IB2011/002757, May 18, 2012, 7 pages.

Written Opinion for PCT/IB2011/002971, mailed May 4, 2012, 6 pages.

Wu et al., Identifying Immature Precursor Cells in Bone Marrow Pathological Images Based on Distance Transform and Internal Structures of Cells. International Conference on Multimedia Technology, Oct. 29, 2010, p. 1-4, (5 pages).

Wu, Q. et al., Microscope Image Processing, Academic Press, 2008, 3 pages.

* cited by examiner

METHODS AND APPARATUS FOR IMAGE ANALYSIS USING THRESHOLD COMPACTNESS FEATURES

TECHNICAL FIELD

This invention relates generally to image processing techniques for identifying and characterizing objects within digital images. More particularly, in certain embodiments, the invention relates to methods and apparatus for characterizing threshold compactness, a new morphological feature of cells in a digital image, and applying this feature in the automated classification of cell phenotype, for example, in image analysis software.

BACKGROUND

The ability to automatically classify objects into categories of interest has applications across a wide range of industries and scientific fields, including biology, social sciences, and finance. One particular application of interest is the classification of biological cells according to cell phenotype.

An accurate and efficient automated cell phenotype classification method requires identifying morphological characteristics of individual cells and/or sub-cellular objects, as pictured in a digital image, which are useful for distinguishing different cell phenotypes. Thus, when using image processing techniques to perform cell phenotype classification, it is desired to identify morphological features that vary according to the different cell types in an image and are characteristic of those cell types. A cell type having a unique size, for example, may be identified by evaluating the sizes of the cells in the image. Likewise, a cell type having a particular characteristic shape or color may be identified by evaluating the shapes and colors of the cells in the image. The more a morphological feature (e.g., size, shape, or color) varies from one cell type to the next, the more useful that feature is for distinguishing different types of cells during cell phenotype classification.

Identification of sub-cellular objects in images, such as nuclei, micronuclei, cytoplasm, and organelles, may be particularly useful for classifying cell phenotype. However, such objects must be distinguishable from image artifacts, and overlap of multiple sub-cellular objects should be identified as such, rather than erroneously identified as a single object. The most widely used cell detection methods detect nuclei in a first step and whole cells around the nuclei in one or more subsequent steps. It may be relatively easy to detect nuclei since DNA stains are widely known and available.

Automated image processing techniques are useful to standardize the classification process for improved accuracy and speed of cell classification. However, existing automated image processing techniques are often incapable of distinguishing among the different cell phenotypes in an image. Existing image processing techniques can also be overly complicated, difficult to describe and implement, and computationally expensive.

There is a need for more accurate and efficient image processing techniques for identifying different types of objects, such as sub-cellular objects, in an image. In particular, there is a need for new features that may be used to identify and characterize sub-cellular objects in an image, for the purpose of automated cell phenotype classification.

SUMMARY OF THE INVENTION

The methods and apparatus described herein are capable of robust and efficient identification and characterization of morphological features of objects within an image. A new family of morphological features, referred to herein as threshold compactness features, is provided. In one embodiment, one or more thresholds and/or binary masks are applied to an image, and provisional objects within the image are automatically identified. The compactness of these provisional objects is then calculated and evaluated, thereby allowing objects in the image to be distinguished and characterized. Compared to previous techniques, the methods and apparatus described herein are more robust and computationally efficient.

In one aspect, the invention relates to a method for determining threshold compactness features of cells useful for classifying cell phenotype. The features are determined from one or more images of the cells. The method includes the steps of: (a) automatically detecting an object depicted in an input image, thereby defining a masked portion of the input image corresponding to the object; (b) identifying one or more provisional objects within the masked portion of the input image using a threshold intensity; and (c) computing a threshold compactness for the object, wherein the threshold compactness is a function of area S of the one or more provisional objects and border length P of the one or more provisional objects.

In certain embodiments, the object comprises at least one member selected from the group consisting of a cell, a nucleus, and a cytoplasm of a cell. In certain embodiments, the method includes the step of classifying cell phenotype using the computed threshold compactness. In certain embodiments, the area S of the one or more provisional objects is determined as the number of pixels of the one or more provisional objects, and the border length P of the one or more provisional objects is determined as the number of pixels associated with the one or more provisional objects with at least one neighboring pixel which is not a pixel of the one or more provisional objects. In certain embodiments, the threshold compactness for the object is $2(\pi S)^{0.5}/P$. In certain embodiments, the input image, or a portion thereof, is filtered (e.g., using a sliding parabola filter) prior to step (a) and/or prior to step (b).

In another aspect, the invention relates to an apparatus for determination of threshold compactness features of cells useful for classifying cell phenotype, said features determined from one or more images of the cells. The apparatus includes a memory for storing a code defining a set of instructions, and a processor for executing the set of instructions. The code includes a threshold compactness module configured to: (i) automatically detect an object depicted in an input image, thereby defining a masked portion of the input image corresponding to the object; (ii) identify one or more provisional objects within the masked portion of the input image using a threshold intensity; and (iii) compute a threshold compactness for the object, wherein the threshold compactness is a function of area S of the one or more provisional objects and border length P of the one or more provisional objects.

In certain embodiments, the object comprises at least one member selected from the group consisting of a cell, a nucleus, and a cytoplasm of a cell. In certain embodiments, the threshold compactness module is configured to classify cell phenotype using the computed threshold compactness. In certain embodiments, the provisional object area S is determined as the number of pixels of the one or more provisional objects, and the provisional object border length P is determined as the number of pixels associated with the one or more provisional objects with at least one neighboring pixel which is not a pixel of the one or more provisional objects. In certain embodiments, the threshold compactness for the object is $2(\pi S)^{0.5}/P$. In certain embodiments, the input image, or a portion thereof, is filtered (e.g., using a sliding parabola filter) prior to step (ii).

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWINGS

The objects and features of the invention can be better understood with reference to the drawings described below, and the claims.

DESCRIPTION

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

Throughout the description, where systems are described as having, including, or comprising specific components, or where processes and methods are described as having, including, or comprising specific steps, it is contemplated that, additionally, there are systems of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

When using automated image processing techniques, a cell phenotype classification process begins with the acquisition of an image depicting one or more cells. In certain embodiments, one or more texture energy filters is applied to calculate and characterize texture features of the one or more cells in the image. A texture energy filter is a type of image filter with non-negative output. For example, a texture energy filter may output an image with a peak at a position where the image best matches a certain shape. As an example, a gradient energy filter returns an image that measures intensity gradient (i.e., slope) of the original image. As another example, a spot filter returns an image with high intensity at pixels having both principal curvatures negative. Typically, threshold compactness is calculated for both unfiltered images and a set of filtered images. In certain embodiments, a filter (e.g., a Gaussian filter and/or a sliding parabola filter) is applied to remove noise or extraneous features from the acquired image.

One family of morphological features that may be characterized in an image (e.g., a gray-scale image) includes threshold adjacency statistics. To calculate these features, a lower threshold and/or an upper threshold is applied to an original image to produce a binary image with pixels that are either white (e.g., intensity equals one) or black (i.e., intensity equals zero). For each white pixel in the image, the number of white neighbor pixels is counted. Using this technique, the first statistic is the number of white pixels with no white neighbors, and the second statistic is the number of white pixels with a single white neighbor. Additional statistics are defined similarly, according to other numbers of white pixel neighbors. The threshold adjacency statistic approach is cost-effective and may be easily applied to both two-dimensional (2-D) images and three-dimensional (3-D) images.

Compactness (also called roundness) is a morphological feature that may be used to characterize one or more objects in an image (e.g., a binary image). Compactness is usually defined so that an ideally round object has unit compactness, while objects that are irregularly shaped (e.g., expanded in one or more directions, with outgrown arms or tails) have lower values of compactness. A simple definition of compactness for an object is the square root of the object's area divided by the length of the object's border, multiplied by a constant that adjusts the compactness of an ideally round object to unity (e.g., $2\sqrt{\pi}$).

The concept of threshold adjacency is combined with the characterization of compactness in a unique way to produce threshold compactness features that are found to be very useful, for example, in the classification of cell phenotype.

In certain embodiments, the methods and apparatus described herein provide a new family of morphological features for characterizing and classifying one or more objects (e.g., biological cells) in an image. In one embodiment, the new family of morphological features is obtained by applying a filter (e.g., a texture energy filter) to the image to obtain a filtered image. Numerous morphological features may then be extracted from the filtered image. The step of texture filtering is optional, thereby diversifying the family of features. For example, in one embodiment, an original image or a filtered image is used to calculate threshold compactness. In certain embodiments, a provisional mask is created by applying a threshold to an original or filtered image of an object.

In certain embodiments, the calculation of threshold compactness features is divided into three consecutive steps: (a) image filtering, (b) creation of a provisional object(s) using a threshold, and (c) calculation of compactness of the provisional object(s). Step (a) is optional, which means the original (unfiltered) image may be directly used in step (b). Alternatively, various filters that convert the input image (e.g., a gray-scale image) into another image may be applied. Examples of the types of filter that may be used include a sliding parabola filter and/or a texture energy filter. The results of steps (b) and (c) may depend on the type of filter used and on one or more filter input parameters.

In one embodiment, step (b) (i.e., creation of a provisional object using a threshold) is a mathematical operation applied to a gray-scale image that produces a binary image (mask). A threshold intensity is selected as an input parameter to the mathematical operation. All pixels with input intensity equal or above the threshold are set to 1, while all pixels with intensity less than the threshold are set to 0. In certain embodiments, the threshold may be either absolute or relative. If the threshold is relative, then absolute threshold is calculated from the input image, using any of several options. For example, the absolute threshold may be set to a constant fraction (e.g., 50%) of the maximum intensity of the characterized object. Another option is to set the absolute threshold to a constant times the mean intensity of the characterized object. In the above-described examples, absolute threshold is calculated object-wise so that each object has its own threshold. Alternatively, a single threshold may be applied to the entire image, which may include multiple objects. With this latter approach, however, there is a risk that absolute threshold will be below the maximum intensity for some objects. Such objects have no provisional objects and therefore an undefined threshold compactness.

In certain embodiments, a provisional object refers to an object (such as a cell) or a region of an object (e.g., a sub-region of a cell) within an image. For example, a provisional object (or a set of provisional objects) may correspond to an entire cell or a part of a cell, such as a sub-cellular object within the cell (e.g., the cell nucleus, a micronucleus, a cytoplasm, and/or an organelle). In one embodiment, a provisional object is a contiguous region within an image of a cell, wherein the pixel intensities within the region are greater than or equal to a threshold value. In addition, a single cell may have any number of provisional objects associated with it. For example, the single cell may include one provisional object or a plurality of provisional objects.

Various approaches may be used to perform step (c) (i.e., calculation of compactness of a set of provisional objects associated with the original object). In one embodiment, a simple formula for calculating the compactness of a set of provisional objects uses the area S (e.g., the number of pixels with binary value 1) and the border length or perimeter P (e.g., the number of pixels with binary value 1 and with at least one neighbor with binary value 0). The simple formula is $$\text{Compactness} = \frac{2\sqrt{\pi S}}{P} \quad (1)$$

This formula may return biased results, particularly when an object is small (e.g., less than 100 pixels or less than 10 pixels). In other embodiments, more sophisticated formulas may be used to calculate compactness. For example, in one embodiment, the border length P is determined by distinguishing between pixels with one, two, three, or four neighboring pixels with value 1.

All three steps (a, b, c), described above, may be applied to both 2-D and 3-D images, in a straightforward and computationally efficient manner. For example, in one embodiment, applying object-wise thresholds to objects in 3-D images is no different, in principle, than performing this step with 2-D images.

Figure 1:
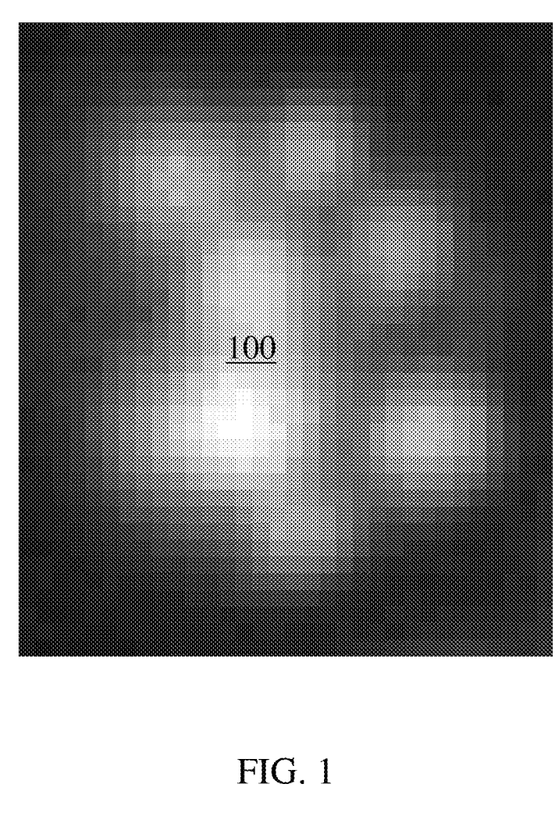
FIG. 1 is an image of a single object to be characterized, according to an illustrative embodiment of the invention.
Figure 2:
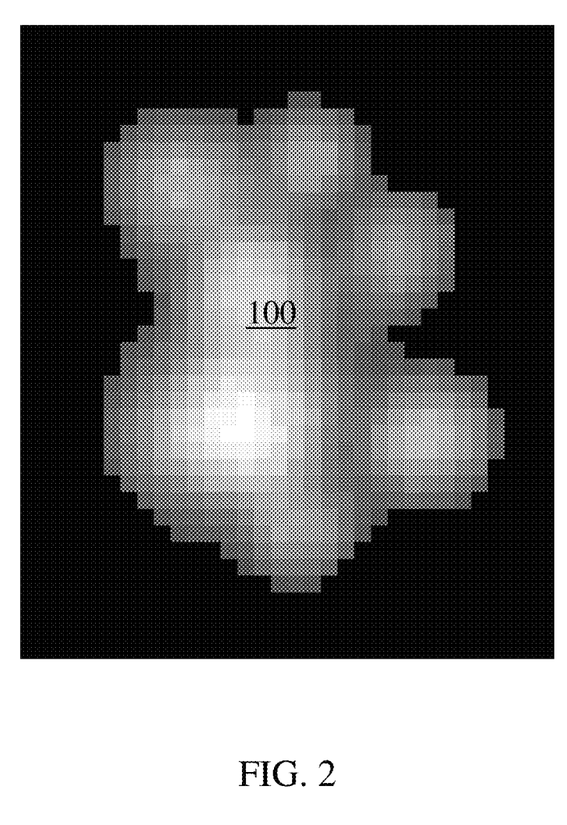
FIG. 2 is an image of the object of FIG. 1 after a mask had been applied, according to an illustrative embodiment of the invention.

FIGS. 1 through 5 are images of a detected object 100 (e.g., a cell) and morphological features of the object, in accordance with one embodiment of the invention. FIG. 1 is an original image of the detected object 100. FIG. 2 is an image of the detected object 100 after a mask has been applied to convert all background pixels (i.e., pixels not belonging to the object 100) to black. The mask describes the location of the detected object 100.

Figure 3:
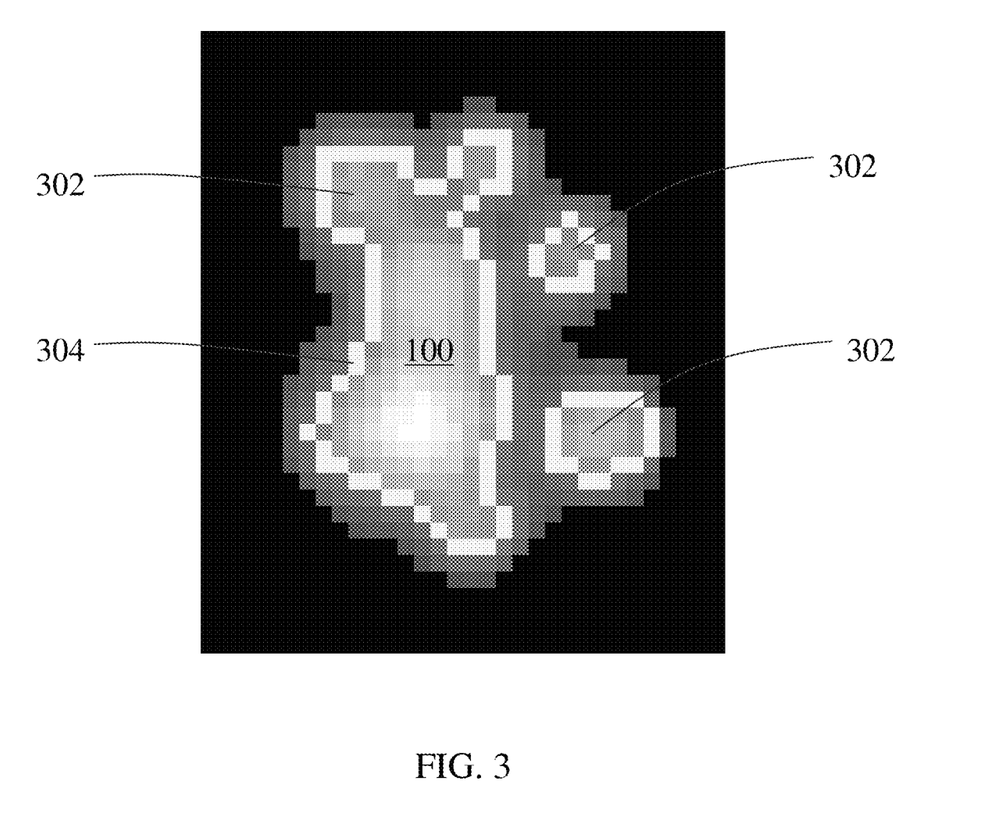
FIG. 3 is an image of provisional objects, created by applying a threshold to the image of FIG. 2, in which border pixels of the provisional objects are highlighted, according to an illustrative embodiment of the invention.

FIG. 3 is an image showing three separate (i.e., disconnected) provisional objects 302 within the detected object 100. A border 304 around each provisional object has been highlighted. The provisional objects 302 in this figure were created by applying a threshold equal to 40% of the maximum intensity of the object 100 in the original image. In other words, each pixel within the provisional objects 302 of FIG. 3 has an intensity that is greater than or equal to 40% of the maximum intensity of the object 100 in FIG. 2.

In certain embodiments, the threshold used to identify provisional objects associated with a cell (or other object) is set equal to a fraction of the maximum or mean intensity of the pixels in the cell. When threshold is defined in this manner, at least one pixel in the cell will belong to a provisional object.

Figure 4:
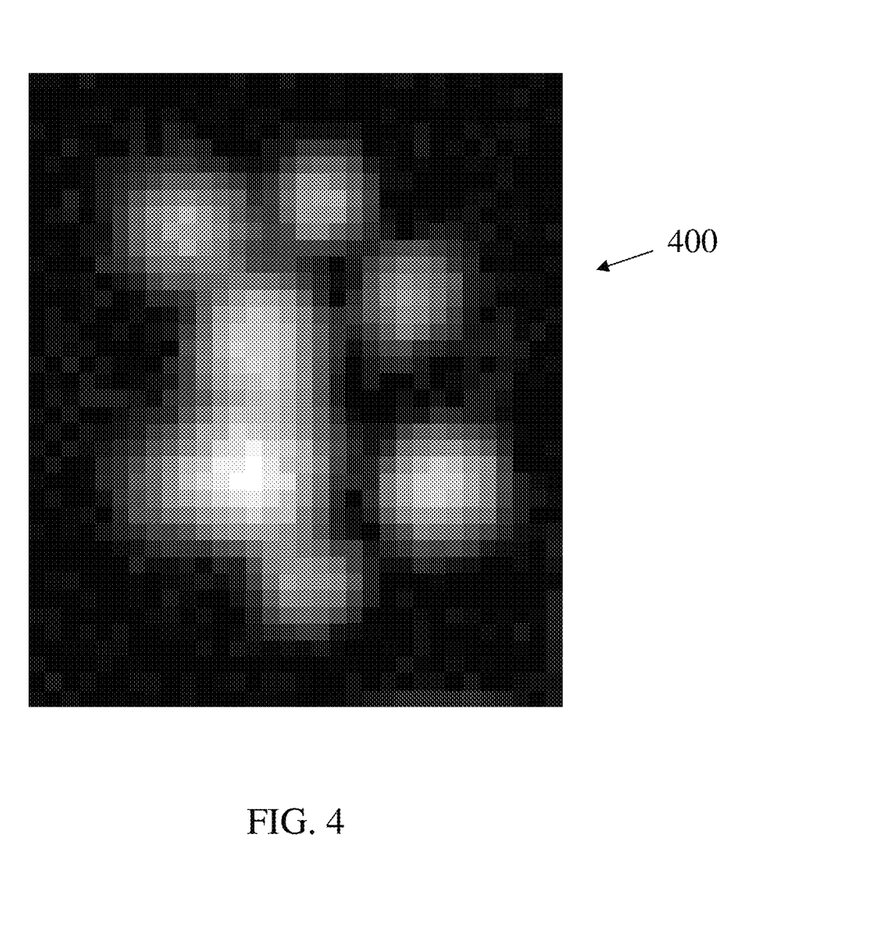
FIG. 4 is an image of the object of FIG. 1 obtained by applying a sliding parabola filter to the image of FIG. 1, according to an illustrative embodiment of the invention.

FIG. 4 is a sliding parabola-filtered image of the original image in FIG. 1. As depicted, application of the sliding parabola filter created a new image with different properties than the original one.

Figure 5:
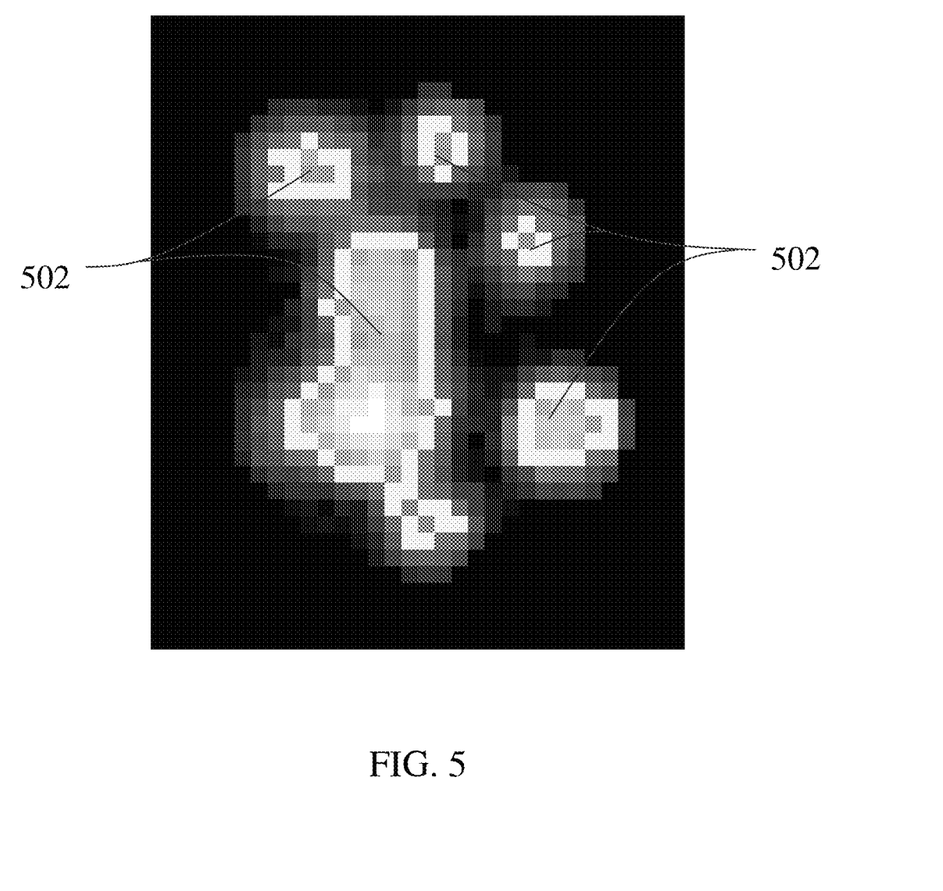
FIG. 5 is an image of provisional objects, created by applying a threshold to the image of FIG. 4, in which border pixels of the provisional objects are highlighted, according to an illustrative embodiment of the invention.

FIG. 5 is an image of five provisional objects 502 created by applying a threshold to the filtered image of FIG. 4, in accordance with one embodiment of the invention. The threshold in this case was 40% of the maximum intensity in FIG. 4. Comparing FIGS. 3 and 5, application of the sliding parabola filter increased the number of provisional objects from three to five.

Figure 6:
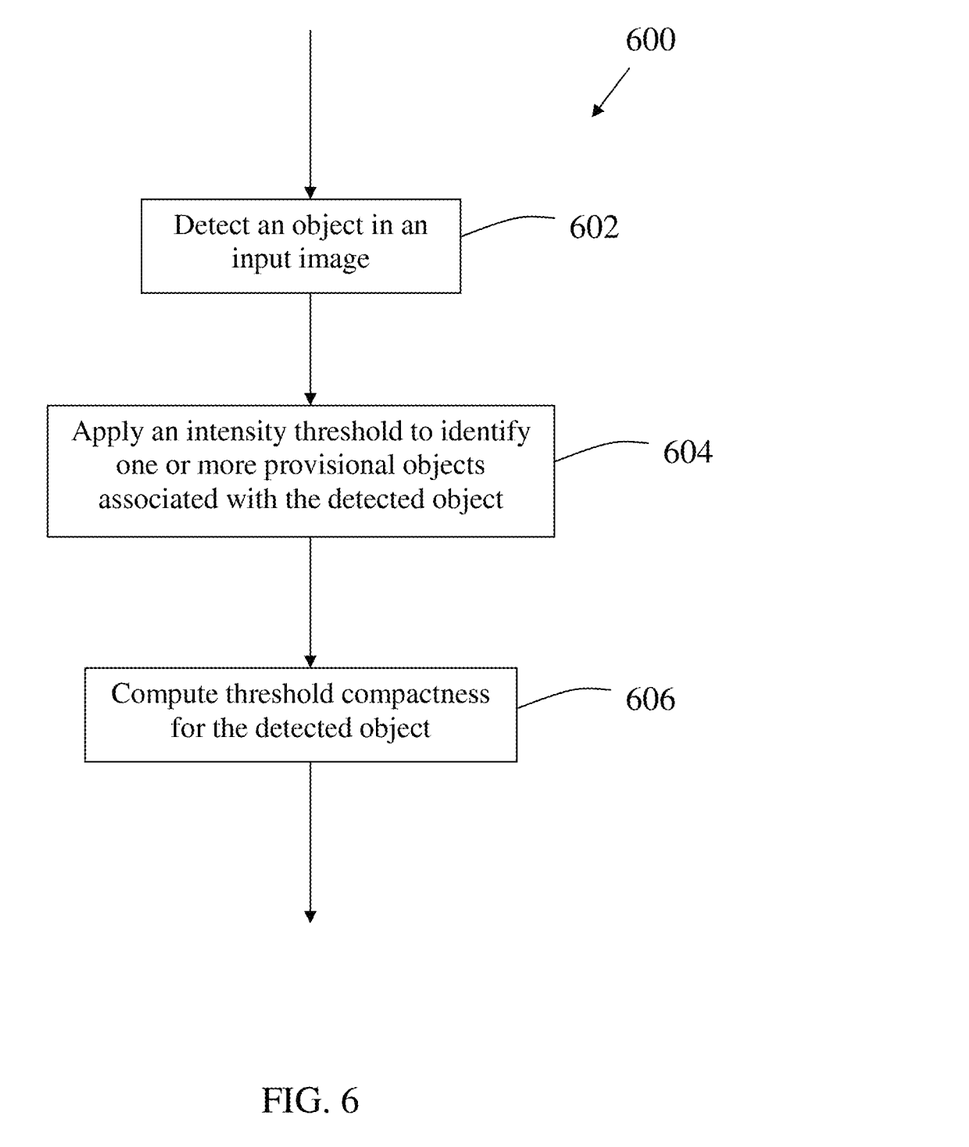
FIG. 6 is a flowchart of a method for determining threshold compactness features, according to illustrative embodiments of the invention.

Referring to FIG. 6, in certain embodiments, a method 600 is provided for determining threshold compactness features of cells useful for classifying cell phenotype. The features are determined from one or more images of the cells. At step 602, the method 600 includes automatically detecting an object depicted in an input image. In certain embodiments, the object is a cell or a sub-region of a cell (e.g., a cell nucleus). A masked portion of the input image is defined corresponding to the detected object. At step 604, the method 600 includes identifying one or more provisional objects within the masked portion of the input image using a threshold intensity. The input image or a portion thereof may be filtered (e.g., using a sliding parabola filter or a texture energy filter) prior to step 602 and/or step 604. At step 606, the method 600 includes computing a threshold compactness for the object. The method 600 may also include classifying cell phenotype using the computed threshold compactness.

In certain embodiments, to calculate the threshold compactness value for a cell (or other object), the method 600 includes determining a border length P equal to the sum of the border lengths for all of the provisional objects associated with the cell. The method also includes determining an area S equal to the sum of the areas for all of the provisional objects associated with the cell. Threshold compactness is then calculated from the border length P and the area S using equation (1), above. In general, when a single cell includes many provisional objects, the calculated threshold compactness of the cell is low, even when each provisional object is round.

In certain embodiments, the area S is determined as the number of pixels in the one or more provisional objects within a cell or other object. For example, the area S may be the total number of pixels in the provisional objects associated with the cell. In one embodiment, the border length P is determined as the number of pixels in the one or more provisional objects that have at least one neighboring pixel that is not located within the same provisional objects (i.e., the one or more provisional objects). For example, a border pixel in a provisional object is a pixel that has at least one neighbor that is not located on the provisional object. In one embodiment, border length P is the sum of all such border pixels associated with the one or more provisional objects. As mentioned, the threshold compactness for a cell or other object that includes the one or more provisional objects may be given by $2(\pi S)^{0.5}/P$.

In certain embodiments, after one or more cells have been identified in the input image, a first threshold is applied to create a first binary mask. The first binary mask is then applied to the original image to obtain a modified image that includes the identified cells superimposed on a uniform background (e.g., a black background with pixels having an intensity of zero). Next, one or more provisional objects are identified within the cells by applying a second threshold to create a second binary mask. After applying the second binary mask to the modified image, one or more provisional objects are isolated and revealed. The second threshold value for determining the second binary mask may be unique to each cell, or common for all cells in the image. After applying the second binary mask, the image includes the one or more provisional objects superimposed on a uniform background (e.g., a black background). While the description of the preceding methods specifically refers to cells as the objects of interest, the methods may be applied to images that include other objects, besides cells.

Figure 7A:
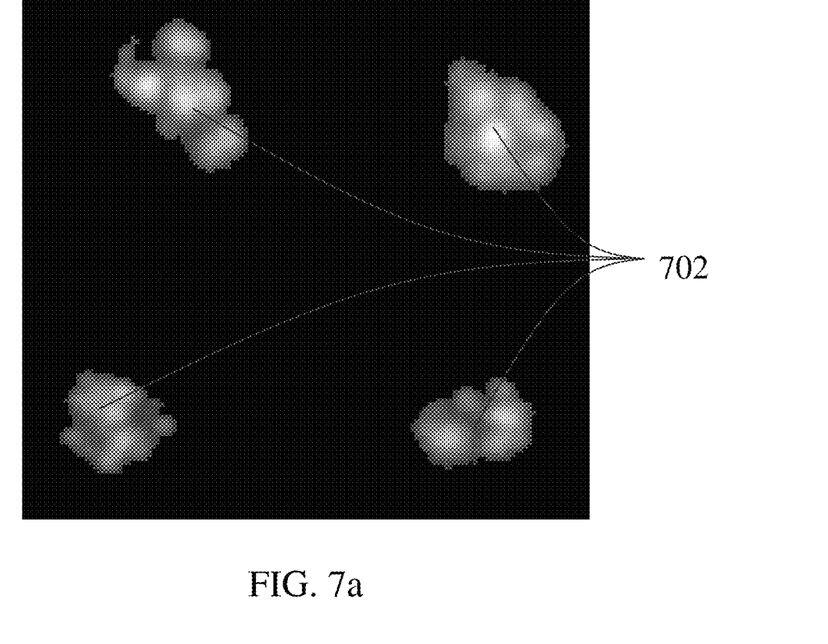
FIGS. 7a and 7b include a pair of images from two different samples of a cell-based assay, according to an illustrative embodiment of the present invention.
Figure 7B:
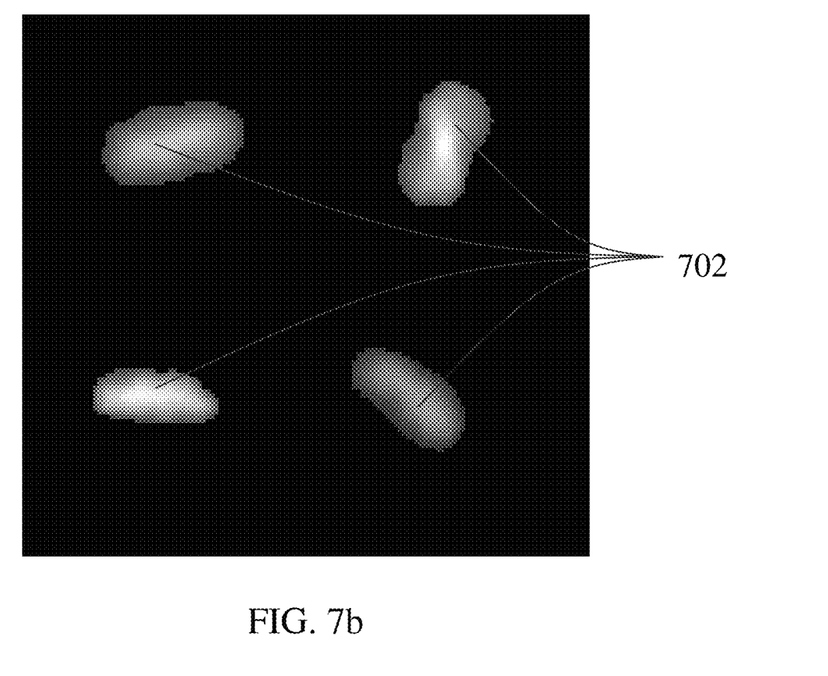

FIGS. 7a through 9 illustrate the use of threshold compactness features for the classification of cell phenotype, in accordance with certain embodiments of the invention. FIGS. 7a and 7b include a pair of images from two different samples of a cell-based assay, with four selected cells 702 each in each image. The detected cells 702 in these images are masked (i.e., pixels outside of the cells 702 are black). FIGS. 8a and 8b include a pair of ridge-filtered images, obtained from the same samples used for FIGS. 7a and 7b, respectively, in which provisional objects 802 have been identified by applying a 30% threshold. Borders 804 of these provisional objects 802 have been highlighted. Comparing FIG. 7a with FIG. 8a, it is seen that each cell 702 in FIG. 7a is associated with several (e.g., at least four) provisional objects 802 in FIG. 8a. By contrast, comparing FIG. 7b with FIG. 8b, it is seen that each cell 702 in FIG. 7b is associated with only one or two provisional objects 802 in FIG. 8b.

Figure 8A:
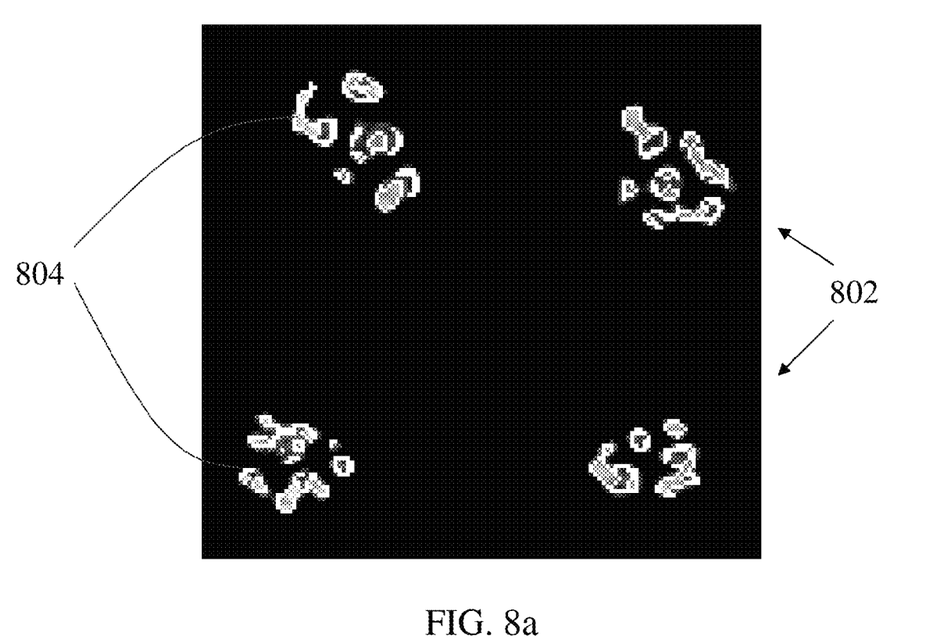
FIGS. 8a and 8b include a pair of ridge-filtered images, obtained from the same samples used for FIGS. 7a and 7b, in which border pixels of the provisional objects are highlighted, according to an illustrative embodiment of the present invention.
Figure 8B:
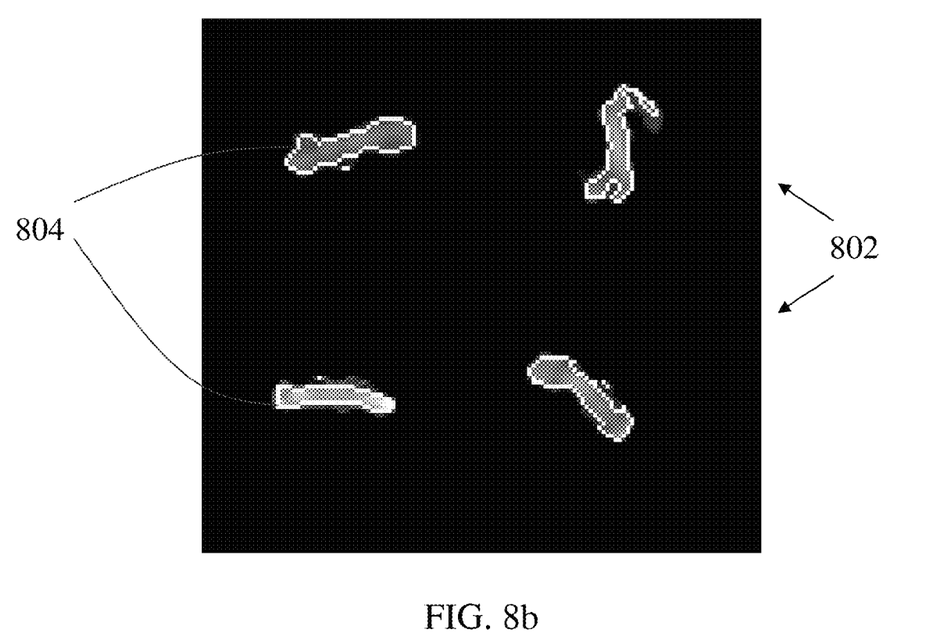
Figure 9:
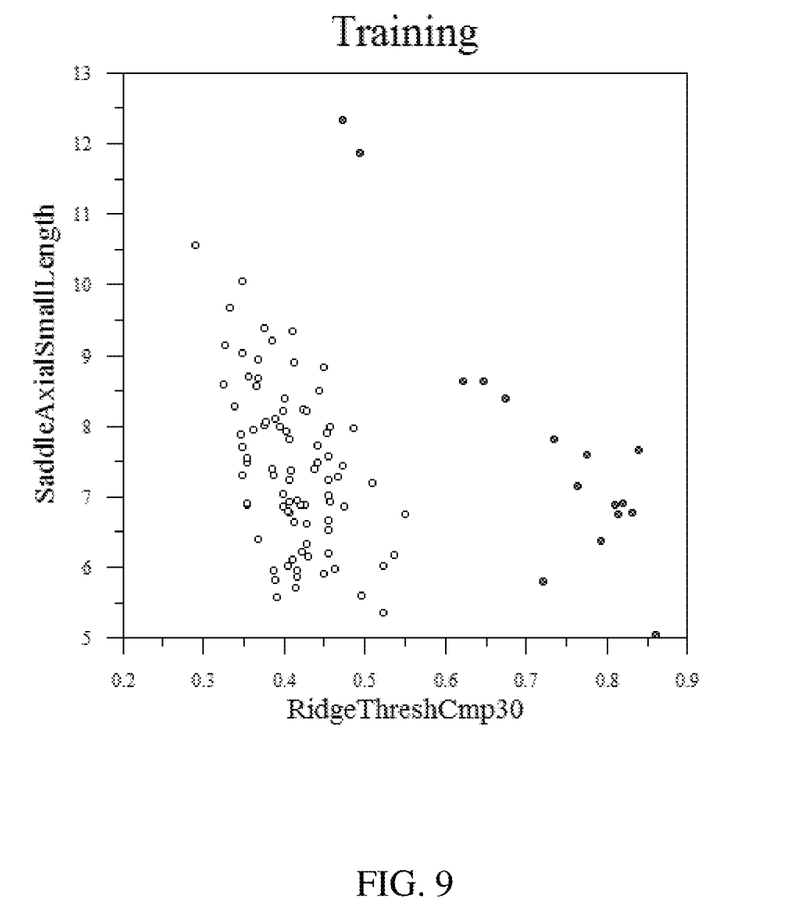
FIG. 9 is an x,y-plot of a best pair of features for separating the two classes of objects depicted in FIGS. 8a and 8b, according to an illustrative embodiment of the present invention.

FIG. 9 is an x,y-plot of the best pair of features for separating the two classes of objects depicted in FIGS. 8a and 8b. The best pair of features for separating the two classes has been automatically selected by the computer among 130 features routinely calculated for each cell. The x-axis is a threshold compactness feature calculated from a ridge-filtered image. Each data point represents a cell, with the white and black circles corresponding to two classes of cells, each from different control samples. The grouping or separation of the black and white circles in this figure indicates the threshold compactness feature is useful for distinguishing between different cell phenotypes.

In certain embodiments, the methods described above are implemented on a computer using computer software. To perform feature extraction, the software may include three building blocks or modules to calculate intensity properties, calculate texture properties, and calculate morphology properties. In one embodiment, the software implements a method for extracting many morphology features in parallel, thereby enabling features from several (e.g., five) different families to be combined. One of the families may be threshold compactness. To calculate threshold compactness features, a calculate morphology properties building block is applied. Next, a user may ensure that the family of threshold compactness features is selected (by default, it is selected). The user may then select a filter(s) (e.g., a texture energy filter) to apply and choose values for the filter input parameters. In another embodiment, a wide set of features is calculated automatically, whenever a classification or regression task is ordered. Later, when the tuning is completed (i.e., the relevant features have been identified), only the relevant features will be calculated.

Regarding computation times, the methods for thresholding and calculating compactness, described herein, are fast compared to other processes, such as texture filtering. For example, in one embodiment, using a 1360×1024 pixel image with 75 detected cells, the computation time for creating provisional objects was 0.012 seconds. The additional time for creating a border and calculating an area of the body and border was 0.012 seconds. The computer used for these calculations was a Dell Latitude 630 (2.2 GHz laptop). Alternatively, texture features may be calculated, since texture-filtered images may already be available and no extra time may be needed for texture filtering. If the overall cost of extracting a feature is around 0.01 seconds or 0.02 seconds, then the computation time may be considered to be small.

It should be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

A computer hardware apparatus may be used in carrying out any of the methods described herein. The apparatus may include, for example, a general purpose computer, an embedded computer, a laptop or desktop computer, or any other type of computer that is capable of running software, issuing suitable control commands, receiving graphical user input, and recording information. The computer typically includes one or more central processing units for executing the instructions contained in software code that embraces one or more of the methods described herein. The software may include one or more modules recorded on machine-readable media, where the term machine-readable media encompasses software, hardwired logic, firmware, object code, and the like. Additionally, communication buses and I/O ports may be provided to link any or all of the hardware components together and permit communication with other computers and computer networks, including the internet, as desired. The computer may include a memory or register for storing data.

In certain embodiments, the modules described herein may be software code or portions of software code. For example, a module may be a single subroutine, more than one subroutine, and/or portions of one or more subroutines. The module may also reside on more than one machine or computer. In certain embodiments, a module defines data by creating the data, receiving the data, and/or providing the data. The module may reside on a local computer, or may be accessed via network, such as the Internet. Modules may overlap—for example, one module may contain code that is part of another module, or is a subset of another module.

The computer can be a general purpose computer, such as a commercially available personal computer that includes a CPU, one or more memories, one or more storage media, one or more output devices, such as a display, and one or more input devices, such as a keyboard. The computer operates using any commercially available operating system, such as any version of the Windows™ operating systems from Microsoft Corporation of Redmond, Wash., or the Linux™ operating system from Red Hat Software of Research Triangle Park, N.C. The computer is programmed with software including commands that, when operating, direct the computer in the performance of the methods of the invention. Those of skill in the programming arts will recognize that some or all of the commands can be provided in the form of software, in the form of programmable hardware such as flash memory, ROM, or programmable gate arrays (PGAs), in the form of hard-wired circuitry, or in some combination of two or more of software, programmed hardware, or hard-wired circuitry. Commands that control the operation of a computer are often grouped into units that perform a particular action, such as receiving information, processing information or data, and providing information to a user. Such a unit can comprise any number of instructions, from a single command, such as a single machine language instruction, to a plurality of commands, such as a plurality of lines of code written in a higher level programming language such as C++. Such units of commands are referred to generally as modules, whether the commands include software, programmed hardware, hard-wired circuitry, or a combination thereof. The computer and/or the software includes modules that accept input from input devices, that provide output signals to output devices, and that maintain the orderly operation of the computer. The computer also includes at least one module that renders images and text on the display. In alternative embodiments, the computer is a laptop computer, a minicomputer, a mainframe computer, an embedded computer, or a handheld computer. The memory is any conventional memory such as, but not limited to, semiconductor memory, optical memory, or magnetic memory. The storage medium is any conventional machine-readable storage medium such as, but not limited to, floppy disk, hard disk, CD-ROM, and/or magnetic tape. The display is any conventional display such as, but not limited to, a video monitor, a printer, a speaker, an alphanumeric display. The input device is any conventional input device such as, but not limited to, a keyboard, a mouse, a touch screen, a microphone, and/or a remote control. The computer can be a stand-alone computer or interconnected with at least one other computer by way of a network. This may be an internet connection.

As used herein, an "image"—for example, an image of one or more cells—includes any visual representation, such as a photo, a video frame, streaming video, as well as any electronic, digital or mathematical analogue of a photo, video frame, or streaming video. Any apparatus described herein, in certain embodiments, includes a display for displaying an image or any other result produced by the processor. Any method described herein, in certain embodiments, includes a step of displaying an image or any other result produced via the method.

In certain embodiments, the methods and apparatus described herein are used for cell phenotype classification and may include the feature selection module described in U.S. patent application Ser. No. 13/230,377, filed Sep. 12, 2011, entitled "Methods and Apparatus for Fast Identification of Relevant Features for Classification or Regression," the disclosure of which is hereby incorporated by reference herein in its entirety.

In certain embodiments, the methods and apparatus described herein utilize sliding parabola erosion. A sliding parabola erosion procedure is described in U.S. patent application Ser. No. 13/230,433, filed Sep. 12, 2011, entitled "Methods and Apparatus for Image Analysis and Modification Using Fast Sliding Parabola Erosion," the disclosure of which is hereby incorporated by reference herein in its entirety.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for classifying phenotype from threshold compactness features of cells, said features determined from one or more images of the cells, the method comprising the steps of:
   (a) automatically detecting, by a processor of a computing device, an object depicted in an input image, thereby defining a masked portion of the input image corresponding to the object;
   (b) identifying, by the processor, a plurality of provisional objects within the masked portion of the input image using a threshold intensity;
   (c) computing, by the processor, a threshold compactness for the object, wherein
   the threshold compactness is a function of total area S of the plurality of provisional objects and total border length P of the plurality of provisional objects; and
   (d) identifying, by the processor, a phenotype classification associated with the object based at least in part on the threshold compactness.

2. The method of claim 1, wherein the object comprises at least one member selected from the group consisting of a cell, a nucleus, and a cytoplasm of a cell.

3. The method of claim 1, comprising classifying cell phenotype using the computed threshold compactness.

4. The method of claim 1, wherein the total area S of the plurality of provisional objects is determined as the number of pixels of the plurality of provisional objects and wherein the total border length P of the plurality of provisional objects is determined as the number of pixels associated with the plurality of provisional objects with at least one neighboring pixel which is not a pixel of the plurality of provisional objects.

5. The method of claim 1, wherein the threshold compactness for the object is $2(\pi S)^{0.5}/P$.

6. The method of claim 1, wherein the input image, or a portion thereof, is filtered prior to step (a) and/or prior to step (b).

7. The method of claim 6, wherein the input image, or the portion thereof, is filtered with a sliding parabola filter prior to step (a) and/or prior to step (b).

8. An apparatus for classifying phenotype from threshold compactness features of cells, said features determined from one or more images of the cells, the apparatus comprising:
   (a) a memory for storing a code defining a set of instructions; and
   (b) a processor for executing the set of instructions, wherein the code comprises a threshold compactness module configured to:
      (i) automatically detect an object depicted in an input image, thereby defining a masked portion of the input image corresponding to the object;
      (ii) identify a plurality of provisional objects within the masked portion of the input image using a threshold intensity; and
      (iii) compute a threshold compactness for the object, wherein the threshold compactness is a function of total area S of the plurality of provisional objects and total border length P of the plurality of provisional objects; and
      (iv) identify a phenotype classification associated with the object based at least in part on the threshold compactness.

9. The apparatus of claim 8, wherein the object comprises at least one member selected from the group consisting of a cell, a nucleus, and a cytoplasm of a cell.

10. The apparatus of claim 8, wherein the threshold compactness module is configured to classify cell phenotype using the computed threshold compactness.

11. The apparatus of claim 8, wherein the total area S is determined as the number of pixels of the plurality of provisional objects and wherein the total border length P is determined as the number of pixels associated with the plurality of provisional objects with at least one neighboring pixel which is not a pixel of the plurality of provisional objects.

12. The apparatus of claim 8, wherein the threshold compactness for the object is $2(\pi S)^{0.5}/P$.

13. The apparatus of claim 8, wherein the threshold compactness module is configured to filter the input image, or a portion thereof, prior to step (ii).

14. The apparatus of claim 13, wherein the threshold compactness module is configured to filter the input image, or the portion thereof, with a sliding parabola filter prior to step (ii).

* * * * *